Feb. 26, 1963  G. WINTRISS  3,078,515
SAFETY CONTROL FOR HYDRAULIC MACHINE
WITH HIGH PRESSURE CLOSING
Filed May 16, 1960
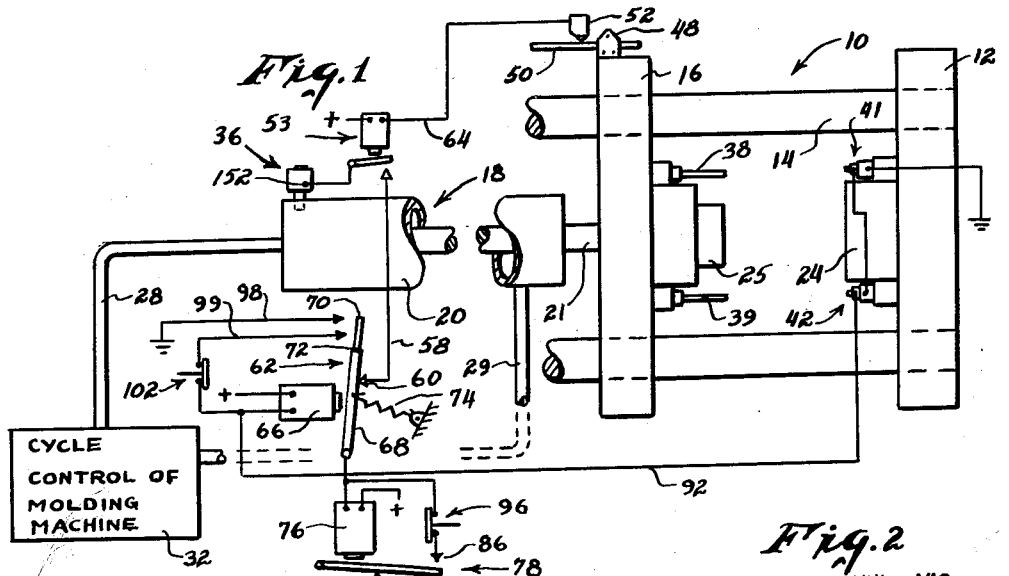
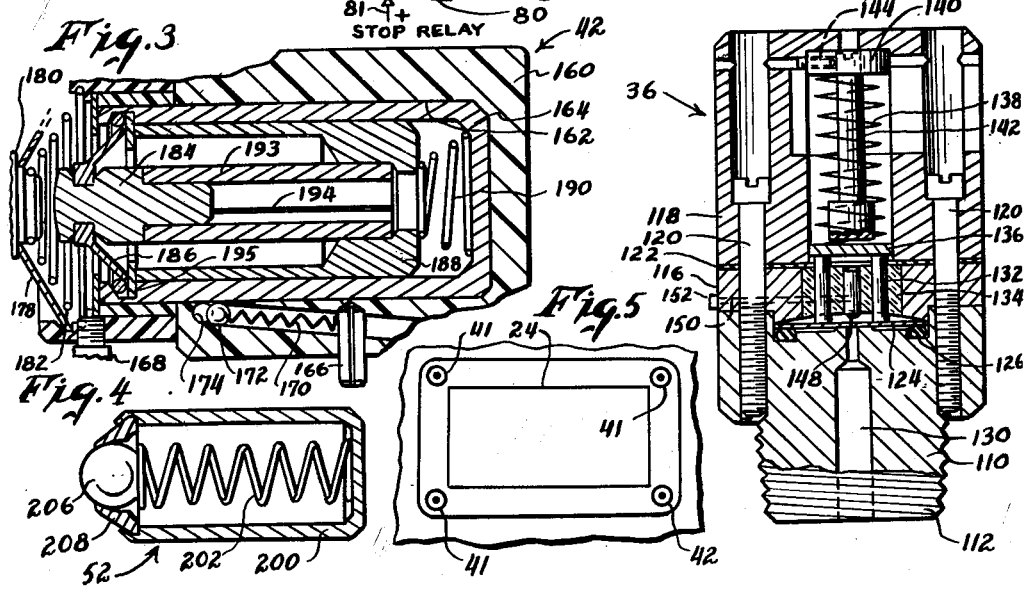
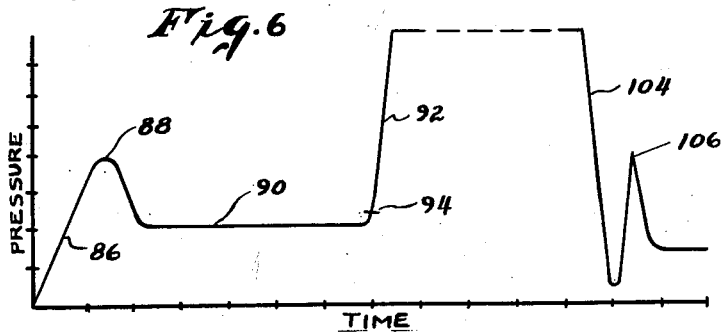
INVENTOR.
George Wintriss
By Emery, Whittemore,
Sandoe & Graham
ATTORNEYS United States Patent Office 3,078,515
Patented Feb. 26, 1963

3,078,515
SAFETY CONTROL FOR HYDRAULIC MACHINE WITH HIGH PRESSURE CLOSING
George Wintriss, Carversville, Pa.
Filed May 16, 1960, Ser. No. 29,368
7 Claims. (Cl. 18—16)

This invention relates to molding machines, or other machines, that have a die with parts that come together to close the die and that move apart into open position to permit removal of a molded or cast article.

Such machines are sometimes prevented from operating satisfactorily by misalignment of the parts, tightening of die pins, lack of lubrication, or protruding objects lodged in the die cavities. Subjecting the dies to full operating pressure under such circumstances may damage them, or damage the molding machine or permit hot material to escape.

Automatic safety controls have been used to stop molding machines when the dies do not fully close in the intended manner; but these automatic controls have been unreliable. One of the chief objections to the automatic safety controls of the prior art is that the adjustment is too critical; and operators of machines sometimes disable the safety controls in order to prevent them from stopping a machine when there is not reason for stopping.

It is an object of this invention to provide an improved automatic safety control for a molding machine; and to provide one that stops the machine in the event of any of the defects described above and with reliable operation.

The invention utilizes electric and electronic circuits and uses the initial contact of parts to detect positions, thereby avoiding any adjustments which require snap action of switches, and the resultant variables which necessarily occur with snap action switches. Another object of the invention is to increase the reliability of an automatic safety control by locating position-detecting means on the die itself, and at opposite sides of the die with circuit connections which require contact of all of the position-detecting means in order to maintain the operation of the machine. In the preferred construction, there is position-detecting means at every corner of the die to insure against an obstruction at a localized location which would result in warping or breakage of the die if full closing pressure were exerted.

Other features of the invention relate to simplified constructions for controlling a molding or casting machine by the combined operation of pressure-detecting and position-detecting means, and with provision for over-riding peaks produced by initial acceleration of the parts and by the snapping opening of toggle joints in machines which are operated by toggles.

Other objects, features and advantages of the invention will appear or be pointed out as the description proceeds.

In the drawing, forming a part hereof, in which like reference characters indicate corresponding parts in all the views;

FIGURE 1 is a diagrammatic view showing a molding machine made in accordance with this invention;

FIGURE 2 is a greatly enlarged sectional view through the pressure-detecting means of the machine shown in FIGURE 1;

FIGURE 3 is a greatly enlarged sectional view of the position-detecting means used on the die in FIGURE 1;

FIGURE 4 is a greatly enlarged sectional view of another position-detecting means used for the movable platen in the machine in FIGURE 1;

FIGURE 5 is an enlarged view showing the locations of the position-detecting means on the die of FIGURE 1; and FIGURE 6 is a chart in which pressure is plotted against time to illustrate the principle of operation of this invention.

FIGURE 1 shows a molding machine 10 having a stationary platen 12 with dowels 14 along which a movable platen 16 is moved by a hydraulic motor 18 including a cylinder 20 and a piston rod 21.

The machine 10 has a die 24 secured to the stationary platen 12, and a complementary die 25 secured to the movable platen 16. When brought together, these dies 24 and 25 enclose the one or more mold cavities for making the particular article for which the machine is used. The motor 18 is shown connected to the movable platen 16 by the piston rod 21; but this piston rod is merely representative of motion-transmitting connections between the motor 18 and the movable platen 16, and it will be understood that many molding machines include toggle linkages for increasing the force exerted by the motor against the dies.

Working fluid is supplied to the head end of the cylinder 20 through piping 28, and to the crank end through piping 29. By means of suitable valve mechanism, this piping 28 and 29 also serves for the exhaust of working fluid during return strokes, in a manner well understood in the art. The valves and most of the control mechanism is enclosed in a housing 32. The drawing shows only that part of the control mechanism which is combined in a new combination to obtain the new results of this invention.

There is a pressure sensor 36 on the cylinder 20 in position to be operated by fluid pressure in the head end of the cylinder. The molding machine 10 has position-detecting means including bumpers 38 and 39, carried by the movable die 25 and sensing units 41 and 42 carried by the stationary die 24.

The bumpers 38 and 39 are in alignment with the sensing units 41 and 42, respectively; and the bumpers are of such length as to actuate the sensing units as the dies 24 and 25 approach closed position with respect to one another.

When the pressure in the pressure sensor 36 rises above a certain limit, as a result of contact of the dies, the automatic control means will stop the further operation of the molding machine unless all of the sensing units 41 and 42 have been actuated to detect normal closing of the dies. When only two sensing units 41 and 42 are used, they are preferably located at diagonally opposite corners of the die. In the preferred construction, however, there are sensing units at all corners of the die 24, as shown in FIGURE 5.

In FIGURE 5, the sensing unit 42 is located at the lower right-hand corner of the die 24 and this sensing unit is the one which connects directly with the control circuit. All of the other sensing units are indicated by the same reference character 41 and each of them is connected in series between the sensing unit 42 and a ground connection. By using four such sensing units, any obstruction which causes warping of the die will be detected.

At one side of the movable platen 16 there is a bracket 48 carrying a contact rod 50. This rod actuates a sensing unit 52 connected in parallel with the pressure sensor 36.

In the actual control apparatus used for this invention, it is preferable to have electronic controls; but for simpler illustration of the invention, two relay switches are used in the control circuit. Before explaining the construction of the pressure sensor and the position-detecting means, the operation of the entire system will be described in connection with FIGURE 1.

The pressure sensor 36 includes electric contacts which close a circuit in response to a pressure rise in the cylinder 20. This pressure sensor is connected through a relay 53 and conductor 58, to a fixed contact 60 of a relay switch 62. A conductor 64 leads from the relay 53 to the sensing unit 52.

When the contact rod 50 is in contact with the sensing unit 52, the conductor 64 is grounded on the molding machine and this completes a circuit to energize the relay 53 and open the circuit between the pressure sensor 36 and the conductor 58. When pressure in the cylinder 20 closes the contact in the pressure sensor 36, the conductor 58 is grounded through the pressure sensor, if the machine has moved far enough to carry the rod 50 beyond the sensing unit 52 so that the circuit of relay 53 is open and the armature of relay 53 has dropped back into position to close the circuit from the conductor 58 to the pressure sensor 36.

The relay switch 62 has an actuating coil 66 and an armature 68. There is an extension 70 of the armature 68 insulated from the rest of the armature by electrical insulation 72. A spring 74 is used to bias the relay switch 62 toward the position shown in FIGURE 1.

With the relay switch 62 in its normal position, shown in FIGURE 1, the circuit from the contact 60 extends through the armature 68 to a coil 76 of another relay switch 78. This other relay switch 78 is the relay which stops the operation of the molding machine in the event that the dies come together before all of the sensing units 41 and 42 have been actuated.

The relay switch 78 has an armature 80 which closes a circuit between a power line 81 and a conductor 82 when the coil 76 is de-energized.

When working fluid is supplied to the motor to close the mold, the pressure in the head end of the motor rises as indicated by the sloping line 86 in FIGURE 6. The force required to accelerate the movable parts of the molding machine causes the pressure to rise to a peak 88. After the parts have been accelerated, pressure of the working fluid drops to a constant pressure 90, necessary to overcome the friction of the moving parts as they travel with uniform velocity.

When the dies come together there is an increase in the pressure of the working fluid, as indicated by the rise 92 on the chart in FIGURE 6. The pressure sensor is designed to operate when the pressure rises above the value indicated by the line 94.

Since the peak pressure 88 is caused by acceleration of the parts, and is a normal pressure rise, it is necessary to design the apparatus so that this pressure rise will not stop the machine. This result is obtained by having the contact rod 50 (FIGURE 1), long enough so that it will keep the relay 53 energized through the sensing unit 52 until the movable platen 16, and its associated parts, have completed their acceleration. Thus the contact 50 and the sensing unit 52 make the safety control ineffective during this initial closing movement of the machine.

The relay switch 78 will operate on the next pressure rise, unless the circuit to the actuating coil 76 is broken before the next pressure rise occurs. For example, if the circuit through the pressure sensor 36 is closed, with the switch 62 in the position shown in FIGURE 1, and with the contact rod 50 out of contact with the sensing unit 52, then there will be a circuit from the pressure sensor 36, conductor 58, fixed contact 60, and armature 68, to the actuating coil 76 of the stop relay 78. Energizing of this coil 76 moves the armature 80 away from the contact on the conductor 81 and opens the power circuit of the molding machine, causing the machine to stop, as previously explained.

When the coil 76 lifts the armature 80, the armature is brought against a fixed contact 86 and establishes a holding circuit which keeps the actuating coil 76 energized so that the machine can not operate regardless of what happens to the other relay switch 62. This holding circuit through the contact 86 can be broken by a push button switch 96 when the control circuits are to be reset for the next operation. The switch 96 is shown as manually operated, but it will be understood that it can be opened by reset mechanism of the machine at a selected time in the cycle. When the switch 96 opens, the armature 80 drops by gravity into its normal position shown in FIGURE 1.

In order to prevent the molding machine from stopping, when the pressure rises as the dies come together, it is necessary to establish a series circuit through all of the sensing units 41 and 42. When such a series circuit is closed, it grounds a conductor 92 leading from one side of the actuating coil 66 of the relay 62. The other side of the coil 66 is always connected with a source of power.

Energizing of the coil 66 moves the armature 68 away from the fixed contact 60 and brings the extension 70 of the armature into position to close a circuit between conductors 98 and 99 which provide a holding circuit for the relay 62. This holding circuit may be broken by a push button switch 102 used to reset the control apparatus in a manner similar to the switch 96, already described.

When a molding operation is completed, the timing control of the machine reverses the supply of working fluid to the motor 18 and causes pressure to drop in the head end of the cylinder 20, as indicated by the line 104. In machines which have a toggle linkage, the snapping of the toggle through its dead-center position causes a back pressure peak in the head end of the hydraulic cylinder, and this peak is designated by the reference character 106 in FIGURE 6. This would cause the machine to stop if it occurred as the dies were closing, but it does not affect the operation if the dies are opening because the armature 68 of the relay switch 62 is held away from the contact 60 after the dies are closed and until the controls have been reset by actuation of the holding circuit switch 102.

FIGURE 2 shows the pressure sensor 36. This pressure sensor has a lower portion 110 with threads 112 which screw into the wall of the hydraulic cylinder. The pressure sensor has an intermediate portion 116 clamped against the lower portion 110 by a top portion 118. Screws 120 extend through the portions 116 and 118 and thread into openings in the lower portion 110. A gasket 122 is shown between the portions 116 and 118.

A flexible diaphragm 124 is enclosed in a chamber between the intermediate portion 116 and lower portion 110. This diaphragm 124 is clamped by the intermediate portion 116 against an O-ring 126 around a cylindrical side wall of the chamber. The diaphragm is exposed to the pressure of the working fluid through a conduit 130 in the lower portion 110 of the pressure sensor.

The diaphragm 124 is urged downwardly, into the substantially flat position shown in FIGURE 2, by a plurality of rods 132 located at angularly-spaced regions around the center of an insert 134 which is made of electrical insulating material and which is pressed into an opening through the intermediate portion 116 of the pressure sensor. A disk 136 contacts with the upper ends of all of the rods 132. This disk is urged downwardly by the pressure of a spring 138 housed in the upper portion of the pressure sensor. The degree of compression of the spring 138 is determined by a collar 140 on a shaft 142 along which the collar is adjustable. There is a set screw 144 for holding the collar 140 in any adjusted position along the shaft 142. Suitable openings are provided through the upper portion of the pressure sensor for reaching the set screw 144 and for holding the shaft 142 while the position of the collar is being adjusted.

There is a fixed center contact 148 in the insert 134, and in position to be touched by the diaphragm 124 when the pressure under the diaphragm rises sufficiently to lift the diaphragm against the pressure of the spring 138 acting through the rods 132. An insulated conductor 150 extends through the intermediate portion 116 of the pressure sensor and connects a terminal 152 with the center contact 148.

The terminal 152 connects, through the relay 53 (FIGURE 1) with the conductor 58 and ultimately with the grounded side of the relay 76. Since the housing of the pressure sensor 36 is grounded on the cylinder 20, it will be evident that contact of the metal diaphragm 124 with the pin 148 completes the circuit of relay 76 and energizes the relay.

FIGURE 3 shows the sensing unit 42. This unit includes a housing 160 containing a chamber 162 in which there is a cylinder 164. The housing 160 is made of electrical insulating material and it has two terminals 166 and 168 extending from it.

The terminal 166 is electrically connected, by a coil spring conductor 170, with a contact consisting of a ball 172 at the upper end of a passage 174 which leads into the chamber 162. The upper end of this passage 174 permits the ball 172 to contact with the cylinder 164.

The chamber 162 is closed at one end by a flexible diaphragm 178 through which a button 180 extends. The button 180 is urged toward the left in FIGURE 3 by a spring 182, and this spring provides an electrical connection between the terminal 168 and the button 180.

When the button 180 is moved to the right, against the force of the spring 182, it contacts with one end of a piston rod 184 that extends through diaphragm 186 and further movement of the button 180 displaces the piston rod 184 and moves a piston 188 toward the right against the pressure of a spring 190.

The apparatus is designed so that the bumpers 38 and 39 move the button 180 into contact with the piston rod 184, and displace this piston rod 184 and its piston 188 just as the dies reach closed position. It should be noted that all of these parts move with a positive displacement and that the contact of the button 180 and piston rod 184 are made without transmitting motion through any resilient parts, as in the case of snap switches. Thus the closing of the circuit between the terminals 166 and 168 corresponds to an exact position of the movable die.

In the construction shown in FIGURE 3, the piston rod 184 is of composite construction and includes a tubular portion 193 with a slit 194 through which the hollow and open-ended portion 193 communicates with the interior of the cylinder around the piston rod and beyond the piston 188.

The cylinder 164 is filled with liquid. The diaphragm 186 fits tightly around the piston rod 184 and extends into a circumferential groove in the piston rod. The outer edge of the diaphragm 186 is sealed by a ring 195 which clamps the periphery of the diaphragm 186 in a groove formed in the wall of the cylinder 164.

Different kinds of liquid can be used in the cylinder 164 and the rate at which the piston 188 moves back to its original position, under the influence of the spring 190 depends upon the viscosity of the liquid, since most of the liquid must pass through the slit 192 in going from one side of the piston to the other. If the liquid is not too viscous, some of it can pass through the running clearance between the piston 188 and the cylinder 164.

With automatic machines having a fixed cycle, the use of the proper liquid in the cylinder 164 can make the contact face on the end of the piston rod 184 a "self-leveling" contact. It is pushed down as much as necessary to permit the bumpers to complete their stroke, and by retarding the return of the piston rod, its contact face is in substantially the correct position for contact with the bumpers on the next cycle.

FIGURE 4 shows the sensing unit 52. This unit includes a housing 200 containing a spring 202 which holds a contact ball 206 against an annular end wall 208.

The spring 202 establishes an electrical connection between the ball 206 and the housing 200 so that there is a good connection even though the ball 206 is displaced slightly from the annular end wall 208 by the contact rod 50 (FIGURE 1).

The preferred embodiment of the invention has been illustrated and described, but changes and modifications can be made and some features can be used in different combinations without departing from the invention as defined in the claims.

What is claimed is:

1. In a machine of the class that has a die with parts that come together and move apart and a motor that brings the die parts together under high pressure, safety control means including a pressure sensor subject to the pressure of the motor, and means for stopping the motor, said means being operated by the pressure sensor when the pressure exceeds a limit value, the combination with said means for stopping the motor, of an electric control circuit comprising position-sensing devices including electric contacts comprising at least two contacts carried by one of the die parts, at spaced apart locations thereon, and other contacts movable as a unit with a different die part during at least the final portion of movement of said different die parts toward a closed position, each of said contacts that are carried by one of the die parts being in the path of a corresponding one of said other contacts that move as a unit with the different die part, each contact being part of the electric control circuit whereby the circuit is closed at the contact when the die parts move toward one another and reach a substantially fully-closed position, at least one of the contacts including yieldable means whereby pressure of the other contact moves the first contact into a retracted position after the initial touching to permit full closure of the die parts, the portion of the circuit that is closed by the touching of two of the contacts being in series with the portion of the circuit that is closed by the touching of contacts at the spaced location on the die, and a controller responsive to the closing of the series connected portions of said electric control circuit, including elements for preventing operation of said means for stopping the motor after said electric control circuit has been closed by touching of the electrical contacts with one another.

2. The combination of claim 1, characterized by said spaced locations being at diagonally opposite sides of the die.

3. The combination of claim 1, characterized by a control circuit having four portions that are in series with one another and each of which portions includes a contact carried by one of the die parts and another contact that moves as a unit with said different part of the die, and the cooperating contacts for each of said portions of the circuit are located at four corners of the die.

4. The combination of claim 1, characterized by another controller including parts that interact when the die parts are widely separated for rendering the pressure sensor ineffective during acceleration of the motor at the beginning of each movement of one of the die parts toward closed position.

5. The combination of claim 1, characterized by another controller operatively connected with the first controller for keeping the pressure sensor ineffective after it has been made so by the position-sensing devices, and reset means for counter-acting the operation of this other controller after the machine has operated far enough to move the die parts into substantially open position.

6. The combination of claim 1, characterized by two other controllers including one that renders the pressure sensor ineffective during initial closing of the die when the pressure is increased by the inertia of the parts when accelerating, and another that renders the pressure sensor ineffective during the initial opening movement of the die.

7. The combination of claim 1, characterized by cooperating contacts at spaced locations around the periphery of the die and with the contacts at each location in series with those at the other locations so that the die must close evenly to establish said control circuit.

References Cited in the file of this patent

UNITED STATES PATENTS

| | | |
|---|---|---|
| 2,375,946 | Reichelt | May 15, 1945 |
| 2,588,066 | Weisberg | Mar. 4, 1952 |
| 2,636,433 | Wennberg | Apr. 28, 1953 |
| 2,801,442 | Moslo | Aug. 6, 1957 |